United States Patent [19]

Carroll

[11] 3,947,694

[45] Mar. 30, 1976

[54] SOUND COMMUNICATION SYSTEM

[75] Inventor: Gordon S. Carroll, Costa Mesa, Calif.

[73] Assignee: International Telephone & Telegraph Corporation, New York, N.Y.

[22] Filed: Sept. 25, 1974

[21] Appl. No.: 509,294

Related U.S. Application Data

[62] Division of Ser. No. 410,776, Oct. 29, 1973, Pat. No. 3,873,980.

[52] U.S. Cl. .................................... 307/11; 307/112

[51] Int. Cl.[2] .............................................. H02J 4/00

[58] Field of Search ................................ 307/11, 112

[56] References Cited

UNITED STATES PATENTS 3,747,092 7/1973 Smith .............................. 340/384 E

*Primary Examiner*—Robert K. Schaefer

*Assistant Examiner*—M. Ginsburg

*Attorney, Agent, or Firm*—A. Donald Stolzy

[57] ABSTRACT

A communication system for an emergency vehicle including a provision for selectively producing plural automatically and manually controlled siren sounds, the sound broadcast of radio reception and the sound amplification of the input to a microphone. A complete momentary-contact, pushbutton console may be employed, if desired, by short circuiting all the inputs to ground except that corresponding to the mode of operation selected. Start up instability is also eliminated. A selector pushbutton performs the dual function of manual siren control. Negative feedback from the speaker is provided selectively for radio and public address system use. Common use of components reduces cost and complexity. For example, common use of a voltage controlled oscillator, two amplifier stages, a driver and a speaker assembly is made. Radio input is turned on by an alternate action switch. As described in the specification, the action of "turning on" the radio shorts out all siren functions by firing silicon controlled rectifiers. The microphone input is turned on by pushing the "push to talk" switch thereon. This action fires all the siren shorting silicon controlled rectifiers through a pulse amplifier.

9 Claims, 17 Drawing Figures

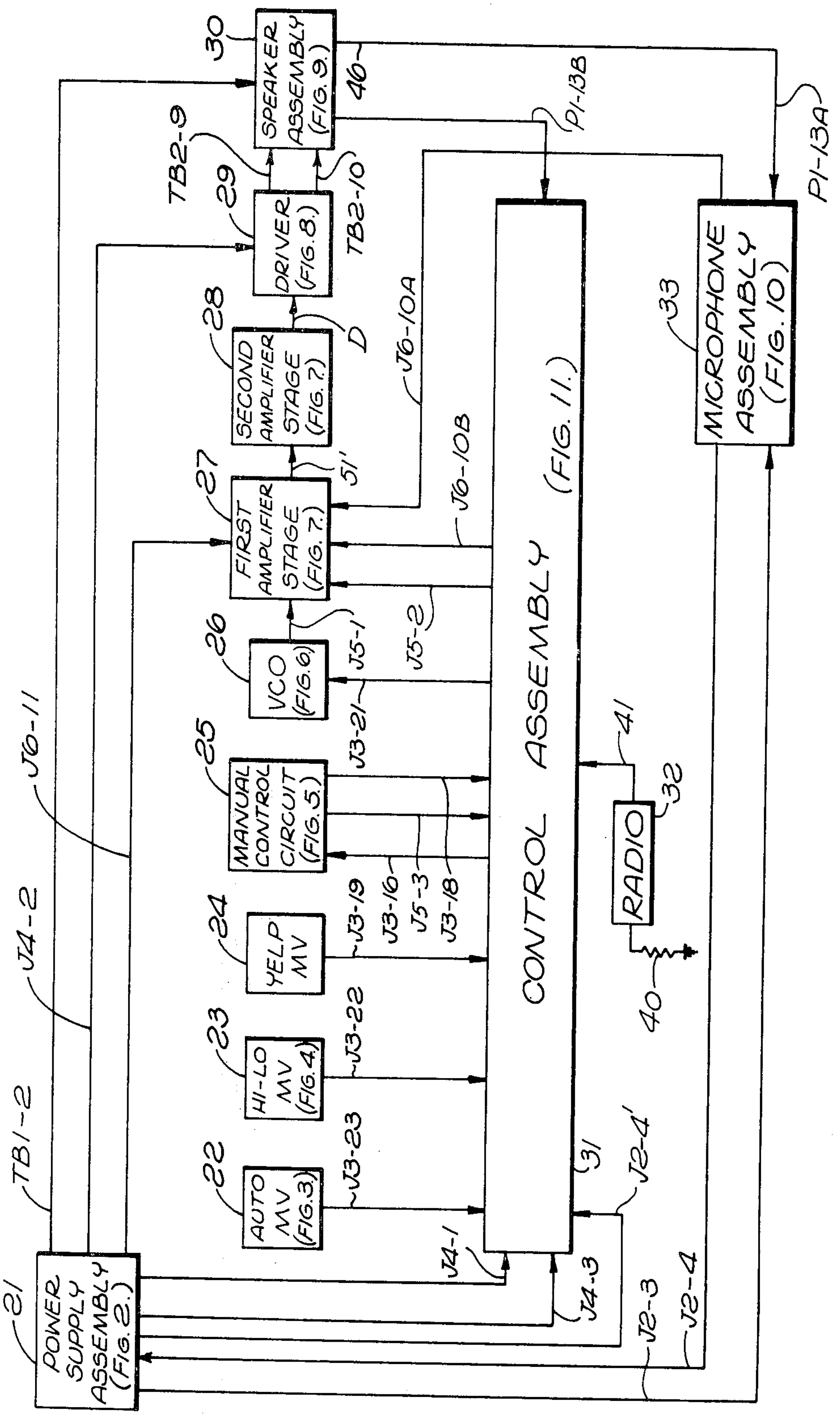
FIG. 1. SOUND COMMUNICATION SYSTEM 20

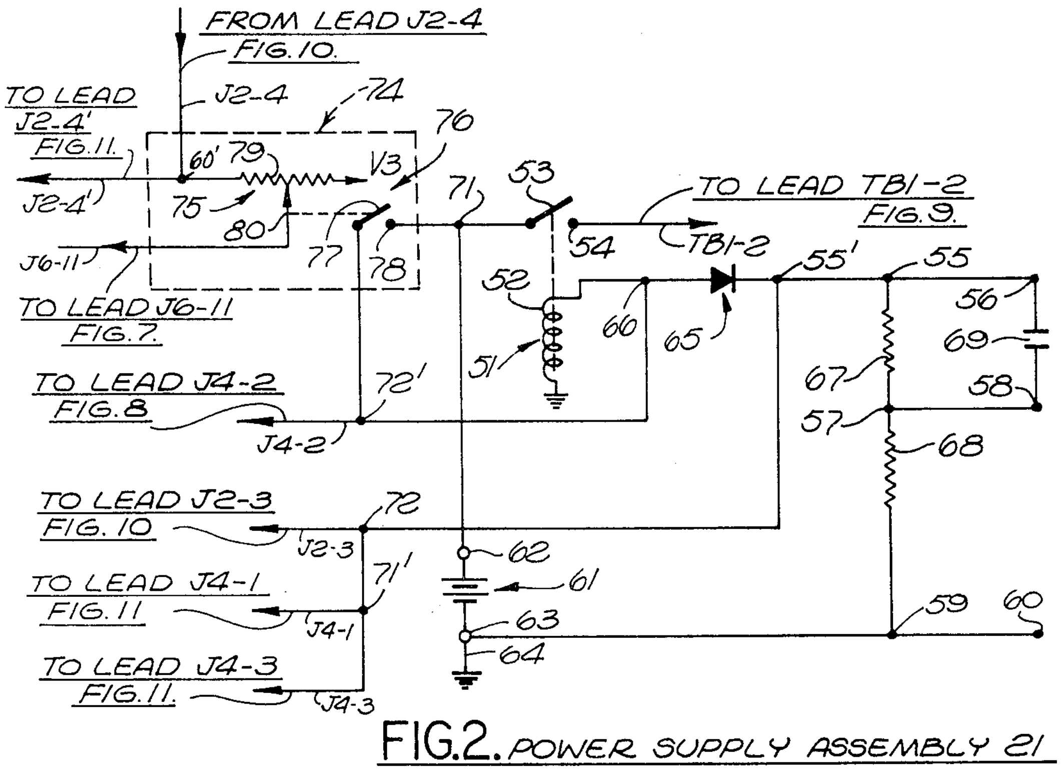
FIG.2. POWER SUPPLY ASSEMBLY 21
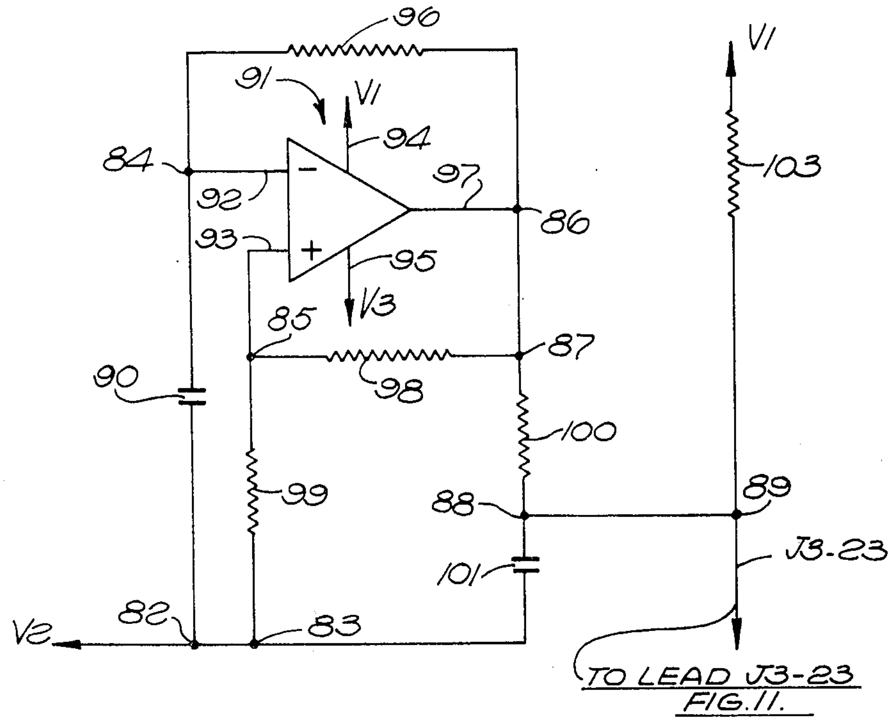
FIG.3. AUTO MV 22

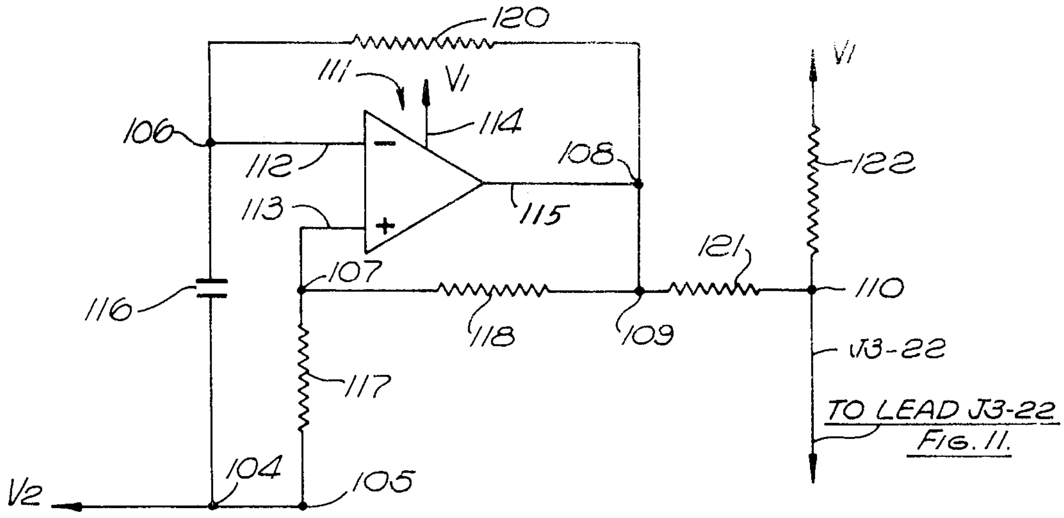
FIG. 4. HI-LO MV 23
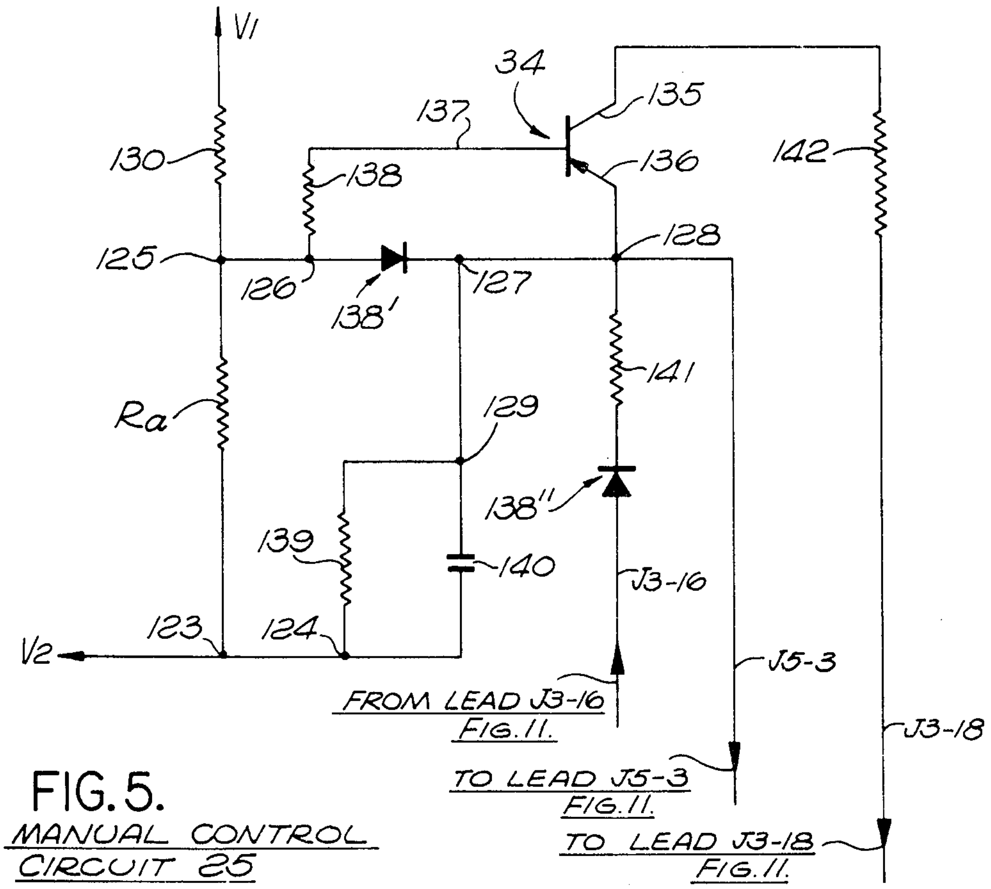
FIG. 5.
MANUAL CONTROL CIRCUIT 25

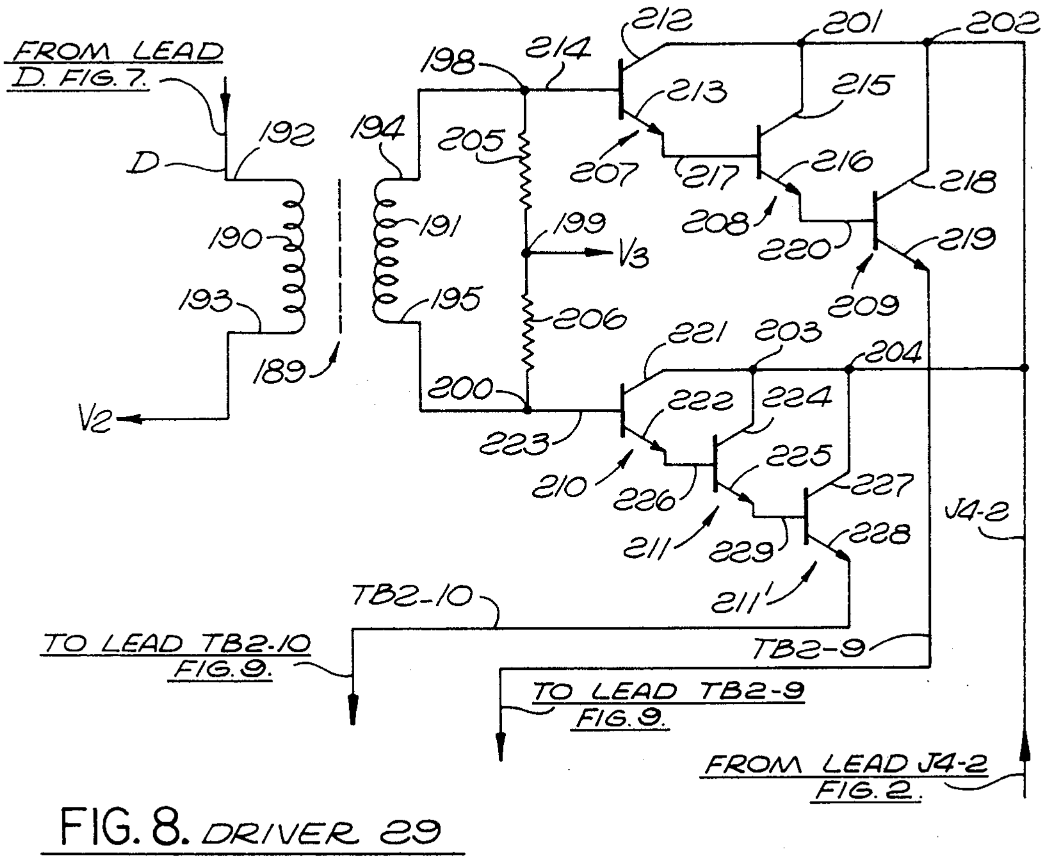
FIG. 8. DRIVER 29
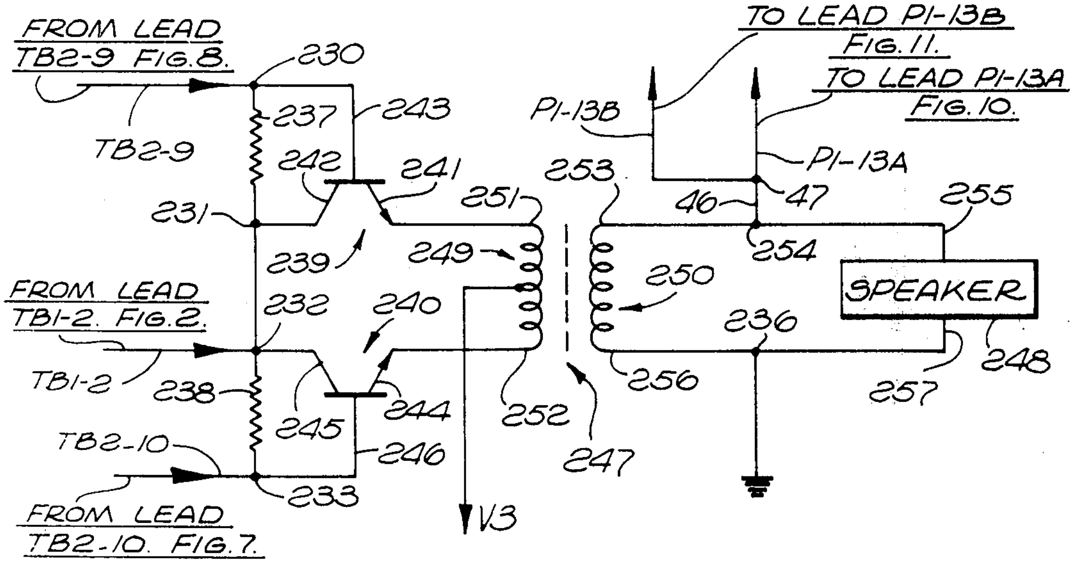
FIG. 9. SPEAKER ASSEMBLY 30

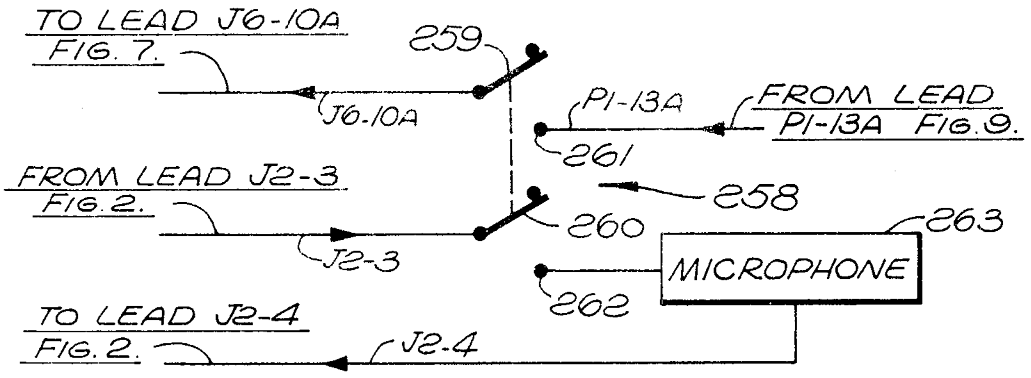
FIG.10. MICROPHONE ASSEMBLY 33
FIG. 12.
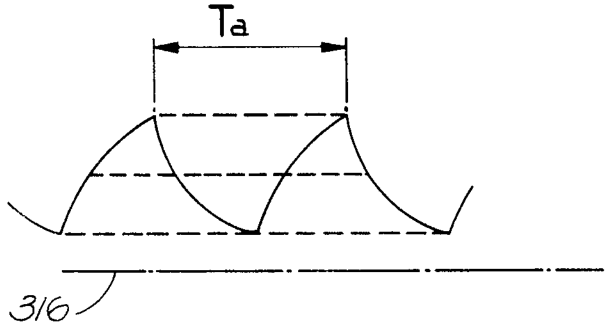
FIG. 13.
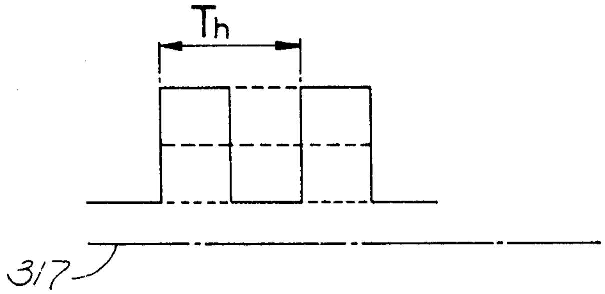
FIG. 14.
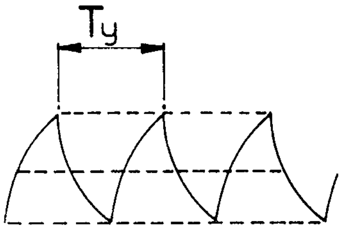

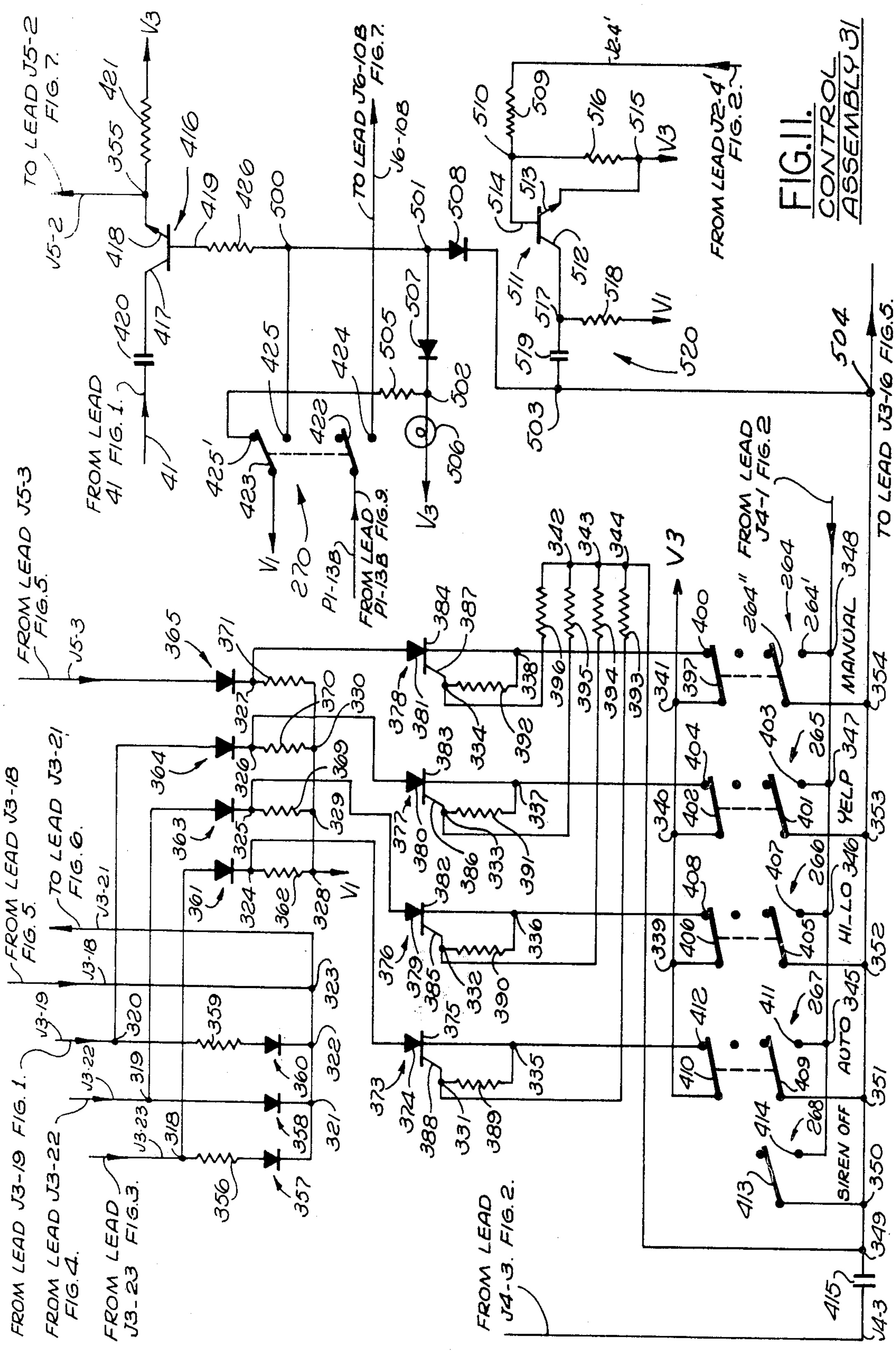
FIG. 11. CONTROL ASSEMBLY 31

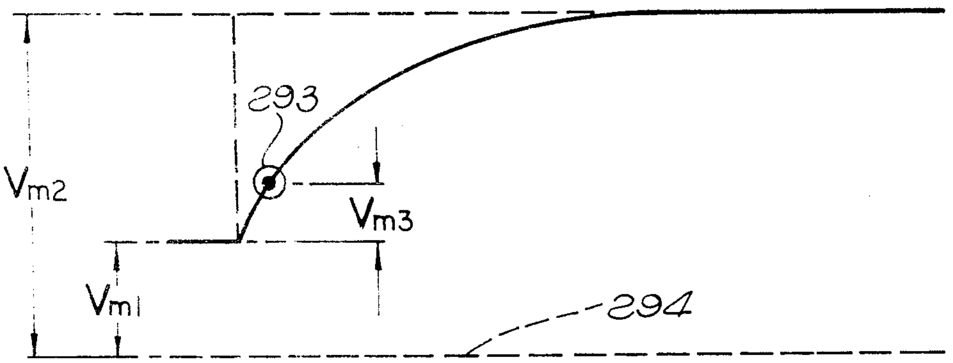
FIG. 15.
FIG. 16.
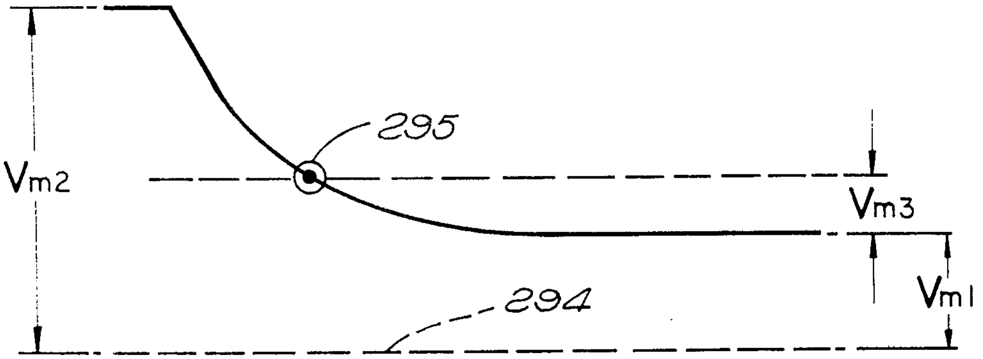
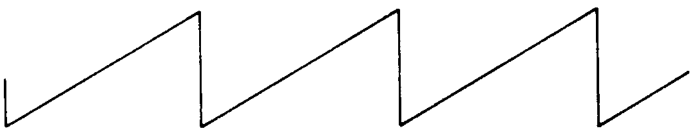
FIG. 17.

SOUND COMMUNICATION SYSTEM

BACKGROUND OF THE INVENTION

This is a divisional application of copending application Ser. No. 410,776 filed Oct. 29, 1973 now U.S. Pat. No. 3,873,980, issued Mar. 25, 1975. The benefit of the filing date of said copending application is, therefore, hereby claimed for this application.

This invention relates to electronic gear for use with loudspeakers, and more particularly, to a multipurpose apparatus for use on emergency vehicles including, but not limited to, ambulances and police patrol cars or elsewhere.

In the past, loudspeaker gear for police patrol cars, for example, have been complicated and expensive. The number of possible functions thereof has also been limited.

SUMMARY OF THE INVENTION

In accordance with the system of the present invention, the above-described and other disadvantages of the prior art have been overcome by providing means to select one of a plurality of modes of operation in a sound communication or other system.

The above-described and other advantages of the present invention will be better understood from the following detailed description when considered in connection with the accompanying drawings.

BRIEF DESCRIPTION OF THE DRAWING

In the drawings which are to be regarded as merely illustrative:

FIG. 1 is a block diagram of a sound communication system constructed in accordance with the present invention;

FIG. 2 is a schematic diagram of a power supply assembly constructed in accordance with the present invention;

FIG. 3 is a schematic diagram of a multivibrator hereinafter called an AUTO MV;

FIG. 4 is a schematic diagram of a multivibrator hereinafter called a HI-LO MV:

FIG. 5 is a schematic diagram of a manual control circuit constructed in accordance with the present invention;

FIG. 8 is a schematic diagram of a driver;

FIG. 9 is a schematic diagram of a speaker assembly;

FIG. 10 is a schematic diagram of a microphone assembly;

FIG. 11 is a schematic diagram of a control assembly; and

FIGS. 12, 13, 14, 15, 16 and 17 are graphs of a group of waveforms characteristic of the operation of the sound communication system of the present invention illustrated in FIGS. 1 to 11, inclusive.

DESCRIPTION OF THE PREFERRED EMBODIMENT

Figure 6:
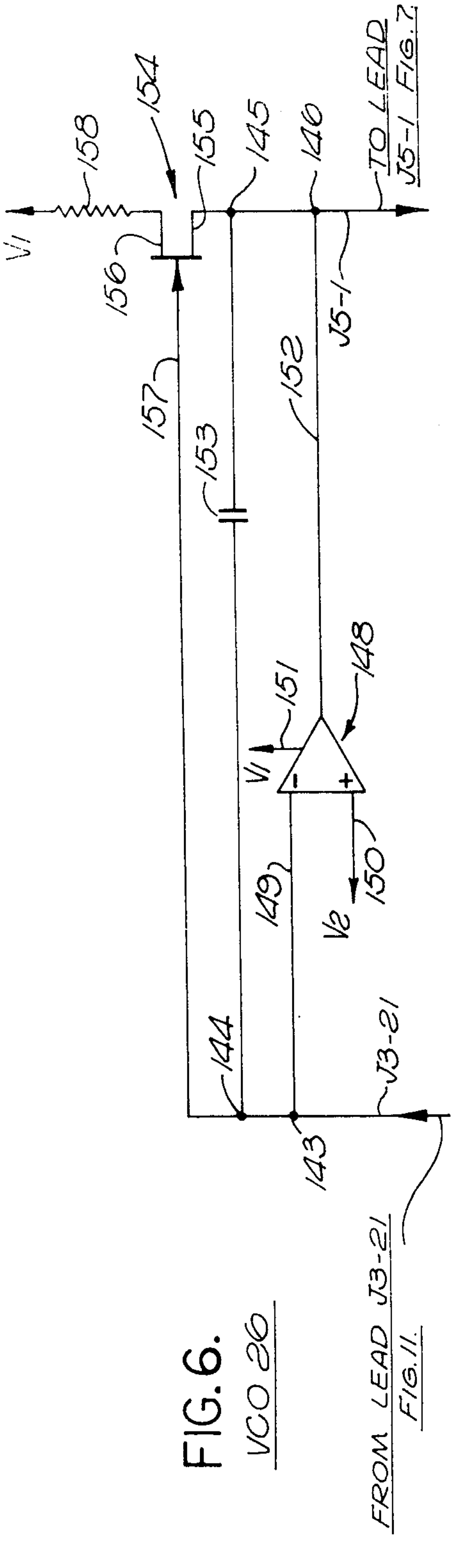
FIG. 6 is a schematic diagram of a voltage controlled oscillator hereinafter referred to as a VCO.

In the drawings, in FIG. 1, a sound communication system 20 is shown including a power supply assembly 21, an AUTO MV 22, a HI-LO MV 23, a YELP MV 24, a manual control circuit 25, a VCO 26, a first amplifier stage 27, a second amplifier stage 28, a driver 29, a speaker assembly 30, a control assembly 31, a radio 32 and a microphone assembly 33.

Power supply assembly 21 has output junctions 56, 58 and 60 shown in FIG. 2 which are maintained at potentials V1, V2 and V3, respectively. Junctions 56, 58 and 60 are connected by leads, not shown in FIG. 1 for clarity, to one or more of the blocks shown in FIG. 1 other than back to power supply assembly 21 itself.

Power supply assembly 21 has a lead TB1-2 connected to speaker assembly 30, leads J4-3, J4-1 and J2-4' connected to control assembly 31, and leads J2-3 and J2-4 connected to and from microphone assembly 33, respectively. Power supply assembly 21 also has a lead J4-2 connected to driver 29, and a lead J6-11 connected to first amplifier stage 27.

The VCO 26 has an output lead J5-1 connected to first amplifier stage 27. The VCO 26 has an input lead J3-21 connected from control assembly 31.

The AUTO MV 22 has an output lead J3-23 connected to control assembly 31.

The HI-LO MV 23 has an output lead J3-22 connected to control assembly 31.

The YELP MV 24 has an output lead J3-19 connected to control assembly 31.

The manual control circuit 25 has an input lead J3-16 and two output leads J5-3 and J3-18 connected to control assembly 31.

First amplifier stage 27 has an input lead J5-1 connected from VCO 26, input leads J5-2, J6-10A and J6-10B connected from control assembly 31, and an output lead 51' connected to second amplifier stage 28.

Lead J6-10A is connected from microphone assembly 33 to first amplifier stage 27.

A lead D connects the output of second amplifier stage 28 to the input of driver 29.

Leads TB2-9 and TB2-10 connect the outputs of driver 29 to speaker assembly 30.

Speaker assembly 30 has output leads P1-13A and P1-13B connected to microphone and control assemblies 33 and 31, respectively.

Radio 32 has one side grounded through a resistor 40 and has an output lead 41 which is connected to control assembly 31.

Power supply assembly 21 is illustrated in FIG. 2 including a relay 51 having a winding 52, a pole 53 and a contact 54.

Junctions are provided at 55, 57 and 59 in FIG. 2 in addition to junctions 56, 58 and 60. A D.C. source of potential is provided at 61 having a positive terminal 62 and a negative terminal 63. The negative terminal 63 is grounded at 64. Junctions 59 and 60 are connected from terminal 63.

A diode 65 is connected from a junction 66 to a junction 55', and is poled to be conductive in a direction toward junction 55'. Junctions 55', 55 and 56 are connected together. Junctions 57 and 58 are connected together.

A resistor 67 is connected between junctions 55 and 57. A resistor 68 is connected between junctions 57 and 59. A capacitor 69 is connected between junctions 56 and 58.

Junctions are also provided at 71, 71', 72 and 72'. Pole 53 is connected from junction 71. Contact 54 is connected to lead TB1-2 in speaker assembly 30, shown in FIG. 9.

Junctions 55' and 72 are connected together.

Lead J2-3 is connected from junction 72 to lead J2-3 of microphone assembly 33 shown in FIG. 10.

Lead J2-4 is connected to a junction 60' from the same lead in FIG. 10. Lead J2-4' is connected from junction 60' to the same lead in FIG. 11.

Junctions 66 and 72' are connected together.

Lead J4-1 is connected from junction 71' to lead J4-1 of control assembly 31 shown in FIG. 11. Leads J4-2 and J4-3 are connected from respective junctions 72' and 71' to respective leads J4-2 and J4-3 in the respective driver 29 and control assembly 31 of FIGS. 8 and 11, respectively. Junctions 71' and 72 are connected together. A dotted box 74 includes a potentiometer 75 and a power switch 76. The main power is turned off by opening switch 76. Switch 76 has a pole 77 which is connected from junction 72', and a contact 78 connected from junction 71. Potentiometer 75 has a winding 79 and a wiper 80. Winding 79 is connected from junction 60' to potential V3. Movement of potentiometer wiper 80 on winding 79 adjusts the volume which is produced when the microphone assembly 33 is employed in the combination to act as a public address system.

Potentiometer wiper 80 is ganged with pole 77 of switch 76. Output lead J6-11 is connected from potentiometer wiper 80. Lead J6-11 in FIG. 2 is connected to input lead J6-11 of first amplifier stage 27 shown in FIG. 7.

The AUTO MV 22 is illustrated in FIG. 3. The AUTO MV 22 has various junctions 82, 83, 84, 85, 86, 87, 88 and 89.

Junctions 82 and 83 are maintained at potential V2. A capacitor 90 is connected between junctions 82 and 84. A differential amplifier 91 is illustrated in FIG. 3 having inverting and non-inverting input leads 92 and 93, respectively.

Amplifier 91 also has positive and negative power input leads 94 and 95 connected to potentials V1 and V3, respectively.

Inverting input lead 92 is connected from junction 84. Non-inverting input lead 93 is connected from junction 85.

A resistor 96 is shown in FIG. 3 connected between junctions 84 and 86.

Amplifier 91 has an output lead 97 connected to junction 86. Junctions 86 and 87 are connected together. A resistor 98 is connected between junctions 85 and 87. A resistor 99 is connected between junctions 83 and 85. A resistor 100 is connected between junctions 87 and 88. A capacitor 101 is connected from junction 88 to junction 83. Junctions 88 and 89 are connected together. A resistor 103 is connected from junction 89 to potential V1. A lead J3-23 is connected from junction 89 to lead J3-23 of control assembly 31 shown in FIG. 11.

HI-LO MV 23 is shown in FIG. 4 having junctions 104, 105, 106, 107, 108, 109 and 110. Again, an amplifier 111 is provided with inverting and non-inverting input leads 112 and 113, respectively. Amplifier 111 also has a positive power input lead 114 connected to potential V1, and an output lead 115 connected to junction 108. A capacitor 116 is connected between junctions 106 and 104. Junctions 104 and 105 are connected to potential V2. The amplifier inverting input lead 112 is connected from junction 106. The non-inverting input lead 113 is connected from junction 107. A resistor 117 is connected between junctions 105 and 107. A resistor 118 is connected between junctions 107 and 109. A resistor 120 is connected between junctions 106 and 108. A resistor 121 is connected between junctions 109 and 110. Junctions 108 and 109 are connected together. A resistor 122 is connected from junction 110 to potential V1. A lead J3-22 is connected from junction 110 to the same lead J3-22 of control assembly 31 shown in FIG. 11.

Figure 7:
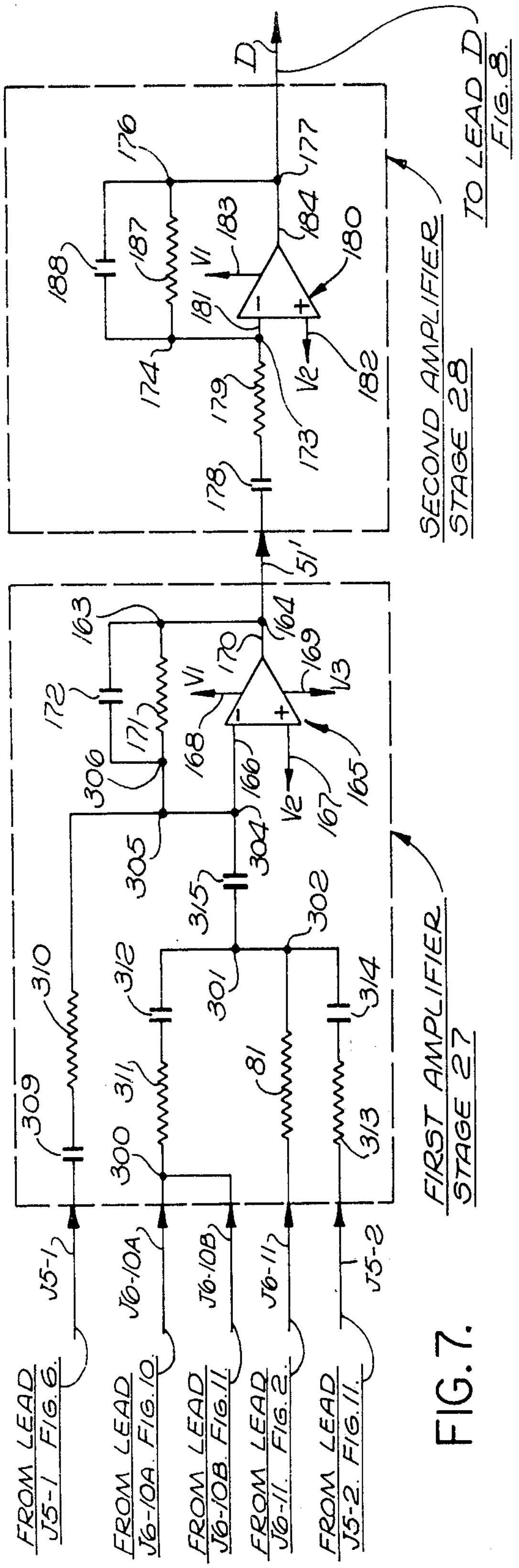
FIG. 7 is a schematic diagram of first and second amplifier stages.

Negative power input leads to amplifiers 111, 148 and 180 in FIGS. 4, 6 and 7, respectively, may be provided internally or conventionally.

Manual control circuit 25 is shown in FIG. 5 including junctions 123, 124, 125, 126, 127, 128 and 129.

A resistor 130 is connected from junction 125 to potential V1. Junctions 123 and 124 are connected to potential V2.

As used herein, the phrase "connected to potential" is hereby defined to mean "connected to a member including, but not limited to, a conductive lead or a conductive junction which has a potential".

In FIG. 5, a resistor Ra is connected from Junction 123 to junction 125. A PNP transistor 34 is provided in FIG. 5 having a collector 135, an emitter 136 and a base 137. A resistor 138 is connected from the base 137 of transistor 34 to junction 126, junctions 125 and 126 being connected together. A diode 138' is connected between junctions 126 and 127 and is poled to be conductive in a direction toward junction 127.

Junctions 127, 128 and 129 are connected together. Transistor emitter 136 is connected from junction 128. A resistor 139 is connected between junctions 124 and 129. A capacitor 140 is also connected between junctions 124 and 129.

A lead J5-3 is connected from junction 128 to the same lead J5-3 of control assembly 31 as shown in FIG. 11.

A resistor 141 and a diode 138'' are connected in that order from junction 128 to lead J3-16. Lead J3-16 is connected to the same lead J3-16 of control assembly 31 shown in FIG. 11. Diode 138'' is poled to be conductive toward resistor 141. Collector 135 is connected to a lead J3-18 through a resistor 142. Lead J3-18 is connected to the same lead J3-18 of control assembly 31 shown in FIG. 11.

VCO 26 is illustrated in FIG. 6 having junctions 143, 144, 145 and 146.

A lead J3-21 is connected from the same lead J3-21 of control assembly 31 shown in FIG. 11 to junction 143.

Again, amplifier 148 is a differential amplifier. Amplifier 148 is provided with an inverting input lead 149, a non-inverting input lead 150, a positive power input lead 151 and an output lead 152. Inverting input lead 149 is connected from junction 143. Non-inverting input lead 150 is connected to potential V2. Positive power input lead 151 is connected to potential V1. Junctions 143 and 144 are connected together. A capacitor 153 is connected between junctions 144 and 145. A unijunction transistor 154 is provided having a first base 155, a second base 156 and an emitter 157. Transistor emitter 157 is connected from junction 144. First base 155 is connected from junction 145. A resistor 158 is connected from second base 156 to potential V1.

Junctions 145 and 146 are connected together. Lead J5-1 is connected from junction 146 to the same lead J5-1 of first amplifier stage 27 shown in FIG. 7.

The first and second amplifier stages 27 and 28, respectively, are shown in FIG. 7.

First amplifier stage 27 has five input leads J5-1, J6-10A, J6-10B, J6-11 and J5-2, and output lead 51'.

Stage 27 has junctions 300, 301, 302, 304, 305 and 306. A capacitor 309 and a resistor 310 are connected in series in that order from lead J5-1 to junction 305. Junctions 304, 305 and 306 are connected together. A resistor 81 is connected from input lead J6-11 to junction 302. Junctions 301 and 302 are connected together. Leads J6-10A and J6-10B are connected to junction 300. A resistor 311 and a capacitor 312 are connected in series in that order from junction 300 to junction 301. A resistor 313 and a capacitor 314 are connected in series in that order lead J5-2 to junction 302. A capacitor 315 is connected between junctions 301 and 304.

First amplifier stage 27 also has junctions 163 and 164. Again, first amplifier stage 27 includes an amplifier 165 with an inverting input lead 166, a non-inverting input lead 167, positive and negative power input leads 168 and 169, respectively, and an output lead 170.

Inverting input lead 166 is connected from junction 304. Non-inverting input lead 167 is connected to potential V2. A resistor 171 and a capacitor 172 are connected in parallel between junctions 306 and 163.

Positive and negative power input leads 168 and 169 are connected respectively to potentials V1 and V3. Amplifier output lead 170 is connected to junction 164. Junctions 163 and 164 are connected together.

As stated previously, the first and second amplifier stages 27 and 28, respectively, are connected over lead 51'.

Second amplifier stage 28 has various junctions 173, 174, 176 and 177.

A capacitor 178 and a resistor 179 are connected in series from lead 51' to junction 173. Junctions 173 and 174 are connected together. Amplifier 180 is provided having an inverting input lead 181, a non-inverting input lead 182, a positive power input lead 183 and an output lead 184. Non-inverting input lead 182 is connected to potential V2. Inverting input lead 181 is connected from junction 173. Positive power input lead 183 is connected to potential V1. Output lead 184 is connected to junction 177.

In FIG. 7, second amplifier stage 28 has a resistor 187 and a capacitor 188 connected in parallel between junctions 174 and 176. Junctions 176 and 177 are connected to a lead D which also connects with the same lead D of driver 29 shown in FIG. 8.

Driver 29 is shown in FIG. 8 including a transformer 189 having a primary winding 190 and a secondary winding 191. Winding 190 has leads 192 and 193. Winding 191 has leads 194 and 195.

Winding lead 192 is connected from lead D which, in turn, is connected from the same lead D of second amplifier stage 28 shown in FIG. 7.

Winding lead 193 is connected to potential V2.

Other various junctions are shown throughout the circuit of FIG. 8 including junctions 198, 199, 200, 201, 202, 203 and 204. A resistor 205 is connected between junctions 198 and 199. Winding lead 194 is connected to junction 198. Winding lead 195 is connected to junction 200. A resistor 206 is connected between junctions 199 and 200. Junction 199 is connected to potential V3. Transistors 207, 208, 209, 210, 211 and 211' are shown in FIG. 8.

Transistor 207 has a collector 212 connected to junction 201, an emitter 213 and a base 214 connected from junction 198.

Transistor 208 has a collector 215 connected to junction 201, an emitter 216 and a base 217 connected from emitter 213. Junctions 201 and 202 are connected together. Similarly, junctions 203 and 204 are connected together.

Transistor 209 has a collector 218 connected to junction 202, an emitter 219 and a base 220 connected from emitter 216.

Transistor 210 has a collector 221 connected to junction 203, an emitter 222 and a base 223 connected from junction 200.

Transistor 211 has a collector 224 connected to junction 203, an emitter 225 and a base 226 connected from emitter 222.

Transistor 211' has a collector 227 connected to junction 204, an emitter 228 and a base 229 connected from emitter 225.

Lead TB2-10 is connected from emitter 228 to the same lead TB2-10 in speaker assembly 30 shown in FIG. 9.

Lead J4-2 is connected to junctions 202 and 204 from the same lead J4-2 of power assembly 21 shown in FIG. 2.

Lead TB2-9 connected from emitter 219 is connected to the same lead TB2-9 of speaker assembly 30 shown in FIG. 9.

Speaker assembly 30 is shown in FIG. 9 including junctions 230, 231, 232, 233 and 236, junction 236 being grounded.

A lead TB2-9 is connected from the same lead TB2-9 of driver 29, shown in FIG. 8, to junction 230.

A lead TB2-10 is connected from the same lead TB2-10 of driver 29, shown in FIG. 8, to junction 233.

A resistor 237 is connected between junctions 230 and 231. A resistor 238 is connected between junctions 232 and 233.

Transistors 239 and 240 are also provided. Transistor 239 has a collector 242 connected to junction 231, an emitter 241 connected to one end 251 of a primary winding 249 of a transformer 247. Transistor 239 also has a base 243 connected from junction 230, junctions 231 and 232 being connected together. A tap on winding 249 is connected to potential V3.

Transistor 240 includes a collector 245 connected to junction 232, an emitter 244 connected to the other end 252 of winding 249, and a base 246 connected to junction 233.

The transformer 247 has a secondary winding 250. Transformer secondary winding 250 has a lead 253 connected to a junction 47 via a lead 46, a junction being provided at 254 which is formed at the connection between lead 253, lead 46, and a lead 255 connected to one side of a speaker 248.

Secondary winding 250 has its other lead 256 connected to junction 236 which is grounded. Junction 236 is connected to the other side of speaker 248 over a lead 257. Junction 232 is connected from lead TB1-2 of power supply assembly 21 of FIG. 2.

Microphone assembly 33 is shown in FIG. 10 including a double-pole, switch 258.

Switch 258 has poles 259 and 260 and respective contacts 261 and 262 therefor.

Pole 259 is connected to lead J6-10A that is connected to the same input lead J6-10A of the first amplifier stage 27 shown in FIG. 7.

Pole 260 is connected from lead J2-3 which is, in turn, connected from the same lead J2-3 of power supply assembly 21 shown in FIG. 2.

Contact 261 is connected from negative feedback lead P1-13A which, in turn, is connected from the same lead P1-13A of speaker assembly 30 shown in FIG. 9.

A microphone 263 is connected from contact 262 to lead J2-4 which lead is, in turn, connected to the same lead J2-4 of power supply assembly 21 shown in FIG. 2.

Control assembly 31, shown in FIG. 11, has input leads J3-23, J3-22, J3-19, J3-18, J5-3, 41, P1-13B, J4-3, J2-4' and J4-1 connected from the same corresponding leads in FIGS. 3, 4, 1, 5, 5, 1, 9, 2, 2, and 2, respectively. Control assembly 31 also has output leads J3-21, J5-2, J6-10B and J3-16 connected to the same corresponding leads in FIGS. 6, 7, 7 and 5, respectively.

In FIG. 11, various junctions are shown throughout the circuit of control assembly 31 including junctions 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 500, 501, 502, 503, 504, 510, 515 and 517.

Leads J3-23, J3-22 and J3-19 are connected to junction 318, 319 and 320, respectively. A resistor 356 and a diode 357 are connected in series in that order from junction 318 to junction 321, diode 357 being poled to be conductive in a direction toward junction 321. A diode 358 is connected between junctions 319 and 321 and poled to be conductive toward junction 321. A resistor 359 and a diode 360 are connected in series in that order from junction 320 to junction 322, diode 360 being poled to be conductive in a direction toward junction 322. Junctions 321, 322 and 323 are connected together. Lead J3-18 is connected to junction 323. Lead J3-21 is connected from junction 323.

A diode and a resistor 362 are connected in series in that order from junction 318 to potential V1. Diode 361 is connected between junctions 318 and 324, and poled to be conductive toward junction 324. Resistor 362 is connected between junctions 324 and 328. Junction 328 is connected to potential V1. A diode 363 is connected from junction 319 to junction 325 and is poled to be conductive in a direction toward junction 325. A diode 364 is connected from junction 320 to a junction 326, and is poled to be conductive in a direction toward junction 326. A diode 365 is connected from lead J5-3 to a junction 327, and poled to be conductive in a direction toward junction 327. A resistor 369 is connected between junctions 325 and 329. A resistor 370 is connected between junctions 326 and 330. A resistor 371 is connected between junctions 327 and 330. Junctions 328, 329 and 330 are connected together. A silicon-controlled rectifier 373 has its anode 374 connected from junction 324 and its cathode 375 connected to junction 335. Similarly, silicon-controlled rectifiers 376, 377 and 378 have respective anodes 379, 380 and 381 connected respectively from junctions 325, 326 and 327; and cathodes 382, 383 and 384 connected to junctions 336, 337 and 338, respectively, and gates 385, 386 and 387 connected from junctions 332, 333 and 334, respectively. Silicon-controlled rectifier (SCR) 373 has a gate 388 connected from junction 331. A resistor 389 is connected between junctions 331 and 335. A resistor 390 is connected between junctions 332 and 336. A resistor 391 is connected between junctions 333 and 337. A resistor 392 is connected between junctions 334 and 338. Resistor 393, 394, 395 and 396 are connected respectively from junctions 331, 332, 333 and 334 to junctions 344, 343,

342 and 342, respectively. Junctions 344 and 349 are connected together.

Switches are provided at 264, 265, 266, 267 and 268. Each of the switches enumerated in the last sentence is a momentary contact pushbutton switch. As shown, switch 268 is a single-pole, single-throw switch. Each of the switches 264, 265, 266 and 267 is a double-pole, double-throw switch. Each of the switches enumerated in the second preceding sentence may be identical to the other switches so enumerated, if desired. Some of the details of switch 264 will be described. These details may also apply to the switches 265, 266 and 267 even though they are not mentioned in connection therewith herein. Switch 264 has poles 397 and 264'', and contacts 400 and 264' engageable by poles 397 and 264'', respectively. Switch 264 is a "break-before-make" switch, as are the switches 265, 266 and 267. That is, pole 264'' always breaks with contact 264' before pole 397 engages contact 400.

Switch 265 has poles 401 and 402 engageable with contacts 403 and 404, respectively. Switch 266 has poles 405 and 406 engageable with contacts 407 and 408, respectively. Switch 267 has poles 409 and 410 engageable with contacts 411 and 412, respectively. Switch 268 has a pole 413 engageable with a contact 414.

A capacitor 415 is connected from lead J4-3 to junction 349. Poles 397, 402, 406 and 410 are connected to junctions 341, 340, 339 and 339, respectively. Junction 341 is maintained at potential V3. Contacts 400, 404, 408 and 412 are connected respectively from junctions 338, 337, 336 and 335.

Junctions 349, 350, 351, 352, 353 and 354 are connected together. Poles 264'', 401, 405, 409 and 413 are connected respectively to junctions 354, 353, 352, 351, and 350.

Junctions 345, 346, 347 and 348 are connected together from input lead J4-1 to contacts 411, 407, 403 and 264', respectively. Contact 414 is also connected from junction 345.

Control assembly 31 is provided with a transistor 416 having a collector 417, an emitter 418 and a base 419. A capacitor 420 is connected from lead 41 to transistor collector 417. The emitter 418 of transistor 416 is connected to junction 355. A resistor 421 is connected from junction 355 to potential V3. Lead J5-2 is connected from junction 355.

A double-pole, double-throw switch 270 is also provided. Switch 270 is stable in either one of its positions. That is, it is not a momentary contact switch. Switch 270 has poles 422 and 423 and contacts 424 and 425 engageable thereby, respectively. Switch pole 423 also has a contact 425'. Pole 423 is connected to potential V1. Pole 422 is connected from input lead P1-13B from FIG. 9. A resistor 426 is connected from transistor base 419 to a junction 500. Junction 500 is connected from contact 425. Output lead J6-10B is connected from contact 424.

Junctions 500 and 501 are connected together. Junction 501 is connected from contact 425' by a resistor 505. A lamp 506 is connected from junction 502 to potential V3. A diode 507 is connected between junctions 501 and 502 and poled to be conductive in a direction toward junction 502. A diode 508 is connected between junctions 501 and 503 and poled to be conductive in a direction toward junction 503. Junctions 503, 504 and 354 are all connected together.

A resistor 509 is connected from lead J2-4' from FIG. 2 to a junction 510. A transistor 511 is provided with a collector 512, an emitter 513 and a base 514. Base 514 is connected from junction 510. Emitter 513 is connected to a junction 515. A resistor 516 is connected between junctions 510 and 515, junction 515 being connected to potential V3.

Collector 512 is connected to a junction 517. A resistor 518 is connected from junction 517 to potential V1. A capacitor 519 is connected between junctions 503 and 517.

A voltage which appears at junction 89 in FIG. 3 is illustrated in FIG. 12. Line 316 is zero volts (V3). The fundamental of the waveform of FIG. 12 may have a period equal to $T_a$. In a typical example, $T_a$ might be 8.0 seconds.

The voltage which appears on lead J3-22 shown in FIG. 4 is illustrated in FIG. 13. Line 317 is zero volts. The period $T_h$ of the waveform shown in FIG. 13 may typically be 2.0 seconds.

The YELP MV 24 may be identical to the AUTO MV 22, if desired, with the exception that some circuit values may change so that the YELP equivalent of $T_a$ will be different from $T_a$. The voltage which appears on lead J3-19 shown in FIG. 1 at the output of the YELP MV 24 is illustrated in FIG. 14. In this illustration, the fundamental period $T_y$ may be, for example, 0.5 seconds.

Transistor 34, shown in FIG. 5, acts substantially as a switch and is maintained either at cut-off or at saturation. That is, the transition from cut-off to saturation and vice versa is made very rapidly.

When the button of switch 264 in FIG. 11 is depressed, lead J3-16 in FIGS. 5 and 11 are connected from lead J4-1 in FIGS. 2 and 11 via contact 264' and pole 264''. The depression of the button of switch 264 will cause junction 128 in FIG. 5 to change in potential as illustrated in FIG. 15 from $V_{m1}$ to $V_{m2}$. A voltage directly proportional to that shown in FIG. 15 is then applied to the input of the VCO 26 via transistor 34 (FIG. 5), resistor 142 (FIG. 5), lead J3-18 (FIG. 5) and lead J3-21 (FIGS. 6 and 11). The frequency of the output signal of VCO 26 will change in accordance with this solid line waveform shown in FIG. 15.

In general, transistor 34 in FIG. 5 cannot turn on until the voltage of junction 128 has risen somewhat. For example, it may rise to a point 293 shown in FIG. 15.

In FIG. 15, dotted line 294 may be considered ground or V3, if desired.

When the button of switch 264 in FIG. 11 is no longer depressed, the potential of junction 128 in FIG. 5 may then fall as indicated by the solid line in FIG. 16. Transistor 34 prevents the VCO 26 from producing an output signal of a frequency below a predetermined minimum. The falling potential at 128 in FIG. 5 thus no longer affects the operation of the VCO 26 to the right of point 295 in FIG. 16 because transistor 134 is driven to cut-off at point 295.

The output voltage of VCO 26 which can appear at junction 146 in FIG. 6 may have a wave shape as shown in FIG. 17.

In order to make the foregoing as clear as possible, it should be raised that all the functions illustrated in FIGS. 12–17, inclusive, are potentials which are graphed not necessarily using the same time scales.

In FIGS. 15 and 16, the following relations may or may not be used, as desired:

$V_{m1} = 2V_{m3}$, and $V_{m2} = 6V_{m3}$.

The term $V_{m2}$ may or may not be equal to twelve volts as desired.

At $V_{m1} + V_{m3}$ and at $V_{m2}$, the frequency of the output signal of the VCO 26 may or may not be 500 hertz and 1,500 hertz, respectively, as desired.

The output signal of VCO 26 may be saw-tooth or any other periodic wave.

AUTO MV 22, HI-LO MV 23 and YELP MV 24 all may be conventional multivibrators, or they may be as shown in FIGS. 3, 4 and 3, respectively, with the changes to be noted herein.

In FIG. 2, diode 65 protects all portions of the circuits connected from junctions 56, 58 and 60 when battery 61 is connected between terminals 62 and 63 with the wrong polarity.

In FIG. 5, when the potential of junction 129 rises above the potential of junction 126, transistor 34 is driven to saturation. In this state, transistor 34 operates simply as a closed switch.

When the potential of junction 129 falls below the potential of junction 126, transistor 34 is cut off and any output signal on lead J3-18 is suppressed. In this case, transistor 34 operates as an open switch.

When switch 264 in FIG. 11 is closed, 12 volts, for example, are impressed upon lead J3-16 in FIG. 5 connected to resistor 141. Capacitor 140 then charges, and the potential of junction 129 rises to a maximum of, for example, 12 volts above line 294 in FIG. 15, i.e. to, for example $V_{m2}$.

When pole 264'' disengages contact 264' in FIG. 11, capacitor 140, in FIG. 5, discharges through resistor 139 (see FIG. 16).

In FIG. 6, the input to VCO 26 is supplied over lead J3-21. The output of VCO 26 is supplied over lead J5-1.

First amplifier stage 27 receives negative feedback over leads J6-10A and J6-10B. This feedback is added to the other inputs on leads J5-1, J6-11 and J5-2 via the arrangement of amplifier stage 27 including all those structures therein, the same forming an analog adder. As stated previously, the output of first amplifier stage 27 is connected to the input of second amplifier stage 28 over lead 51'. Second amplifier stage 28 has an output lead D. See FIG. 7.

First amplifier stage 27 receives negative feedback of lead in two ways. This negative feedback is supplied over leads J6-10A and J6-10B. The feedback over lead J6-10A comes from lead P1-13A of speaker assembly 30 (FIG. 9) through switch 258 shown in FIG. 10.

Negative feedback is supplied over lead J6-10B from lead P1-13B of speaker assembly 30 (FIG. 9) to lead P1-13B in control assembly 31 of FIG. 11 and subsequently to lead J6-10B (FIGS. 7 and 11) through switch 270 (FIG. 11).

Leads TB2-10 and TB2-9 connect the outputs of driver 29 shown if FIG. 8 to speaker assembly 30 (FIG. 9). Lead J4-2 is connected from power supply assembly 21 of FIG. 2.

Driver 29 of FIG. 8 receives an input signal over output lead D of second amplifier stage 28 shown in FIG. 7.

VCO 26 may be entirely conventional or as shown. The same is true of first and second amplifier stages 27 and 28, respectively, and driver 29 and speaker assembly 30.

In FIG. 11, resistors 356 and 359 may be considered, if desired, either portions of control assembly 31 shown in FIG. 11, or portions of the corresponding circuits of AUTO MV 22 and YELP MV 24, respectively. The connection of lead J3-18 in FIG. 11 to junction 232, and the connections of diodes 357, 358 and 360 to junctions 321, 321 and 322, respectively, in effect, at junction 323, combine the outputs of AUTO MV 22, HI-LO MV 23, YELP MV 24 and manual control circuit 26 so that they can be impressed, one at a time, upon the VCO 26 via output lead J3-21 in FIG. 11 and the same lead J2-21 in FIG. 6, which lead is the input lead to VCO 26 in FIG. 6.

As will be explained, the potentials of two of the three junctions 318, 319 and 320, by switching, will always be maintained at potential V3 (ground). This means that the desired signal source whose output is impressed upon the input of VCO 26 might be loaded or short circuited to ground were not diodes 357, 358 and 360 provided. That is the reason that these diodes are provided. Resistors 362, 369, 370 and 371 provide current to insure that silicon-controlled rectifiers 373, 376, 377 and 378 remain fired after they have been fired. Diodes 361, 363, 364 and 365 effectively isolate junctions 318, 319 and 320, and lead J5-3, respectively, from junctions 324, 325, 326 and 327 when the last named four junctions have potentials higher than those of junctions 318, 319, 320 and lead J5-3, respectively.

In FIG. 3, resistor 103 provides a level shift of what otherwise would be the output signal of the AUTO MV 22 which would appear at junction 88 so that all portions of the waveform thereof are at amplitudes greater than zero volts. The same is true of resistor 122 in FIG. 4. The same is true of all signals appearing on output lead J3-21 in FIG. 11 under all possible modes of operation.

In FIG. 11, resistors 389, 390, 391 and 392 keep the leakage currents through respectively silicon-controlled rectifiers 373, 376, 377 and 378 from firing them, respectively.

If desired, switch 270 may be an entirely conventional "alternate action" pushbutton switch. That is, it may have a button which when pushed once causes the switch to change to one position, and when pushed twice causes it to change to the other position thereof. Alternatively, switch 270 may be a pushbutton switch having two buttons, one button for one position of the switch and one button for the other position thereof. In this case, the buttons are mechanically connected so that depressing one button causes the other button to be projected outwardly toward the operator and vice versa.

Resistors 393, 394, 395 and 396 are employed to limit the gate currents of the respective silicon-controlled rectifiers 373, 376, 377 and 378.

The depression of the pushbutton corresponding to one of the switches 265, 266 and 267 causes a respective one of the silicon-controlled rectifiers 377, 376 and 373 to be cut off while the others are fired. This allows two of junctions 320, 319 and 318, respectively, to be short circuited to ground (V3). The other one is or is not short circuited depending upon whether or not switch 268 is actuated or not, respectively.

In the case of each of the silicon-controlled rectifiers 373, 376, 377 and 378, the manner of providing a short circuit or an open circuit is the same. For both of these possibilities, only the operation of the silicon-controlled rectifiers produced by depressing switch 265 will be described in detail.

When the pushbutton of switch 265 is depressed, pole 401 will engage contact 403 and an opening voltage supplied over lead J4-1 will be connected to the gates of the silicon-controlled rectifiers from lead J4-1 via contact 403, pole 401, junction 353, junction 352, junction 351, junction 350, junction 349 and through resistors 393, 394, 395 and 396 from respective junctions 344, 343 and 342, junction 342, the last four junctions enumerated being connected from junction 349. In this manner, three of the four silicon-controlled rectifiers will fire because those corresponding to switches 264, 266 and 267 still have their poles 397, 406 and 410 in engagement with the respective contacts 400, 408 and 412. The poles of the switches 264, 266 and 267 and contacts 400, 408 and 412 thus act as three normally closed switches through which the corresponding silicon-controlled rectifiers are fired. However, so long as pole 401 is in engagement with contact 403 of switch 265, as stated previously, pole 402 will not be in engagement with contact 404 and silicon-controlled rectifier 377 cannot fire because the cathode circuit thereof is opened by movement of pole 402 out of engagement with contact 404.

Switch 268 in FIG. 11 is operable to turn the siren off. that is, moving pole 413 of switch 268 into engagement with contact 414 will, when all the pushbuttons corresponding to switches 264, 265, 266 and 267 are not pushed, fire all of the silicon-controlled rectifiers because all of the poles 397, 402, 406 and 410 will lie in engagement with their respective contacts 400, 404, 408 and 412. What is meant by a "manual squelch" is that, at whatever the condition of the operation of the manual control circuit 25 of FIG. 5 when the pushbutton of switch 268 is depressed, the audio output of speaker 248 shown in FIG. 9 will immediately be reduced to zero.

It is not always easy to control the operation of the system 20, and its individual components and sub-components thereof because of transient conditions which can occur when switch 76 in FIG. 2 is first closed. That is the reason for the connection from lead J4-3 in FIG. 2 to the capacitor 415 in FIG. 11, and the reason for the use of capacitor 415 in FIG. 11. Closure of switch 76 causes a spike to be impressed upon junction 349 in FIG. 11 through capacitor 415 which, when the switches 264–267 are in the positions shown in FIG. 11, causes all four of the silicon-controlled rectifiers to fire.

In FIG. 11, transistor 416 operates as a switch which is essentially closed when pole 423 of switch 270 engages contact 425. This passes the radio input on lead 41 to the first amplifier stage 27 in FIG. 7 via lead J5-2. At the same time, negative feedback is supplied to first amplifier stage 27 from lead P1-13B which is connected to pole 422 of switch 270 in FIG. 11, the connection to first amplifier stage 27 being made by switch 270 when pole 422 engages contact 424 and sends the feedback signal to the first amplifier stage 27 in FIG. 7 over lead J6-10B. This feedback signal is desirable to reduce the amplitude of the audio output of speaker 248 when the switch of transistor 416 is "closed."

In a similar manner, feedback is supplied to the first amplifier stage 27 when switch 258 in FIG. 10 is moved from the position shown to a position where poles 259 and 260 engage contacts 261 and 262, respectively. In this case, negative feedback is supplied to contact 261 over lead P1-13A and to lead J6-10A of FIGS. 7 and 10 through pole 259 shown in FIG. 10.

In FIG. 11 lamp 506 is fully brilliant when pole 423 engages contact 425. Lamp 506 has reduced brilliance when pole 423 engages contact 425'. Diode 507 keeps transistor 416 from being fired and the SCRs from being fired when pole 423 engages contact 425'. Diode 508 keeps lamp 506 from being illuminated and transistor 416 from being fired when junction 349 is at a high potential.

When pole 423 engages contact 425, all of the SCRs are fired via diode 508.

When pole 260 engages contact 262 in FIG. 10, the transient voltage thereby created impresses a pulse on junction 503 via capacitor 519 (FIG. 11) which fires all of the SCRs. Transistor 511 in FIG. 11 and the circuit adjacent thereto forms a pulse amplifier 520 which amplifies the transient voltage.

OPERATION

The system 20 of FIG. 1 operates as follows. In the first place, switch 76 in FIG. 2 is closed to supply power. A spike is then transmitted to junction 349 in FIG. 11 to fire all four of the silicon-controlled rectifiers. VCO 26 then does not receive any input signal over lead J3-21 shown in FIG. 11. A signal will then be supplied depending upon which pushbutton of the switches 264–267 is depressed. Depressing one pushbutton will cause the outputs of three of the four leads J3-23, J3-22, J3-19 and J5-3 shown in FIG. 1 to be short circuited to ground. The one of the four last-mentioned leads not short circuited will then be passed over lead J3-21 from control assembly 31 to the input of VCO 26 shown in FIGS. 1 and 6.

If switch 264 is operated, only the manually controlled siren sound will be produced. Otherwise, the AUTO, HI-LO or YELP siren sounds will be produced.

Should switch 264 be actuated and then deactuated, the audio output of speaker 248 may be suppressed simply by placing pole 413 of switch 268 in engagement with contact 414 thereof (FIG. 11). In this manner, the audio output of speaker 248 may be controlled selectively to provide an output corresponding to the outputs of boxes 22, 23, 24 and 25 shown in FIG. 1.

Should it be desirable to connect the output of radio 32 in FIG. 1 to the input of first amplifier stage 27 in FIG. 7, this may be done by moving switch 270 in FIG. 11 to a position opposite that shown in FIG. 11. This will cause transistor 416 to act as a closed switch, and through pole 422 and contact 424 of switch 270, connect negative feedback from speaker assembly 30 of FIG. 9 over lead P1-13B to lead J6-10B of FIGS. 7 and 11.

Microphone assembly 33 may be employed by moving poles 259 and 260 (FIG. 10) into engagement with respective contacts 261 and 262 shown in FIG. 10.

When the output of AUTO MV 22 is being impressed upon VCO 26, speaker 248 will produce an electronic siren sound which is in commmon use today.

When the signal being delivered to the input of VCO 26 is the output of YELP MV 24, speaker 248 produces a sound which is commonly used on board ship in the U.S. Navy to signal an emergency.

When the output signal of HI-LO MV 23 is being impressed upon the input of VCO 26, speaker 248 produces a sound which is commonly used on emergency vehicles in European countries.

A number of portions of this disclosure may be identical to respective portions of copending application Ser. No. 384,889 filed Aug. 2, 1973, by G. S. Carroll for SOUND COMMUNICATION SYSTEM now U.S. Pat. No. 3,882,275 issued May 6, 1975.

Some of the prior art related to the field of the present invention, but not to the invention per se, includes U.S. Pat. No. 3,137,846. Other prior art includes *Electronic Design* 20, Sept. 27, 1967.

If desired, all the multivibrators disclosed herein may be conventional or of a type and for use with operational amplifiers or differential amplifiers disclosed in the book *Operational Amplifiers* by L. P. Hullsman (McGraw-Hill Book Co., 1971).

From the foregoing, it will be appreciated that the adjustment of potentiometer 75 in FIG. 2 does not adjust the radio volume but adjusts only the public address system volume. If desired, potentiometer 75 in FIG. 2 may be turned to produce the lowest volume possible during use of the system 20 (FIG. 1) as a system other than a public address system when switch 76 in FIG. 2 is closed.

None, one, two or three of $V_{m1}$, $V_{m2}$ and $V_{m3}$ in FIG. 15 may or may not be different from $V_{m1}$, $V_{m2}$ and $V_{m3}$, respectively, shown in FIG. 16, and vice versa.

The phrases "power supply" and "power supply assembly" are hereby defined for use herein and for use in all the claims to mean a power supply that may or may not include a battery or the like.

The phrase "means to provide D.C. power" is hereby defined herein and for use in all the claims to mean either a D.C. source of potential, an equivalent thereof or merely two conductive leads.

Preferably, radio 32, shown in FIG. 1, is grounded through resistor 40. This ground preferably is the same chassis ground that is provided from terminal 63 in FIG. 2 at 64 and from winding 52 of relay 51 in FIG. 2.

As stated previously, VCO 26, shown in FIG. 6, may provide an output signal which may or may not be a saw-tooth. In any event, the frequency of the output signal of VCO 26 which appears on output lead J5-1 therefrom, as shown in FIG. 6, can follow, as is well known, the amplitude of the input voltage input thereto supplied over lead J3-21. This following action may be faithful or approximate. However, normally, the output signal of VCO 26, has a frequency of which preferably is approximately proportional to the magnitude of the input voltage to the VCO 26.

The phrase "means connecting," as used herein and as used in all the claims in any of its grammatical forms, is hereby defined to include any one or more of: a resistor, a diode, any transistor, any switch, any conductor or any other component, or otherwise.

The phrase "ramp voltage" is hereby defined for use herein and for use in all the claims to mean either a voltage which increases at least over a portion thereof for a predetermined time interval, or a voltage which decreases at least over a portion thereof during a predetermined time interval. The phrase "ramp voltage" is hereby further defined for use herein and for use in the claims to mean a ramp voltage which is either linear or non-linear during the times that the ramp thereof is increasing or decreasing.

Diode 65, shown in FIG. 2, may be shorted out and omitted in some cases, if desired.

The phrase "in series" is hereby defined for use herein and for use in all the claims to mean in any order.

The word "energized," as describing a power supply or power supply assembly 21 herein and in all the claims, is hereby defined as a condition of power supply energization including, but not limited to, when battery 61, shown in FIG. 2, is connected in power supply assembly 21 as shown in FIG. 2.

Switch 268 in FIG. 11 may also be considered to be a "SIREN OFF" switch.

While the button of switch 264 is depressed, the tone which can be heard over speaker 248 in FIG. 9 will rise in pitch in the manner such as is illustrated in FIG. 15. When the pushbutton switch 264 is released, the pitch of the sound emanating from the speaker 248 will follow the curve of FIG. 16. However, the pitch of the sound will not fall below point 295 in FIG. 16.

In FIG. 11, junctions 318, 319 and 320 may be considered to be the output junctions of AUTO MV 22, HI-LO MV 23 and YELP MV 24, respectively, if desired. In FIG. 5, junction 128 may be considered to be the output junction of manual control circuit 25 because transistor 34 acts merely as a switch.

Resistor 356 and diode 357, diode 358, resistor 359 and diode 360 (FIG. 11), the emitter-collector circuit of transistor 34 (FIG. 5) and/or other portions of the manual control circuit 25 and resistor 142 (FIG. 5) may be described as including, but not limited to, means actuable effectively to disconnect or to produce effectively an open circuit between respective junctions 318, 319 and 320 and lead J3-18 (FIG. 11), and VCO input lead J3-21 shown in FIGS. 6 and 11 when the respective junctions 318, 319, 320 and lead J5-3 are short circuited to ground, such means also being actuable effectively to connect or to produce effectively a conductive path through the respective means when one of the other of junctions 318, 319, 320 and lead J5-3 is short circuited to ground.

What is claimed is:

1. In a sound communication system, the combination comprising: a common output lead; at least first and second signal sources with respective first and second output leads connected therefrom, the sources being constructed in a manner to produce first and second different output signals on the respective first and second output leads thereof; and selectively operable means for connecting either one of the first and second output leads to said common output lead while disconnecting the other of the first and second leads therefrom, said selectively operable means including first and second junctions connected from the first and second leads, respectively, first and second means connected from said first and second junctions, respectively, to said common output lead, said first means being actuable to produce effectively an open circuit between said first junction and said common output lead when said first junction is short circuited to ground, said first means being actuable to produce effectively a conductive path between said first junction and the common output lead when said first junction is not short circuited to ground, said second means being actuable to produce effectively an open circuit between said second junction and the common output lead when said second junction is short circuited to ground, said second means being actuable to produce effectively a conductive path between said second junction and the common output lead when said second junction is not short circuited to ground, said first means and said second means including first and second silicon-controlled rectifiers, respectively, having first and second anodes, respectively, first and second cathodes, respectively, and first and second gates, respectively, third means connecting said first junction to said first anode, fourth means connecting said second junction to said second anode, first and second double-pole, double-throw, momentary contact switch means including first and second normally closed switches, respectively, and first and second normally open switches, respectively, ganged together in a manner such that each normally open switch breaks before the normally closed switch ganged therewith breaks, said first and second normally closed switches being connected from said first and second cathodes, respectively, to ground, a common input lead, said first and second normally open switches being connected in parallel between an approximately constant potential conductor and said common input lead, and fifth and sixth means connecting said common input lead to said first and second gates, respectively.

2. The invention as defined in claim 1, wherein one of said first and second means includes a diode poled to be conductive in a direction toward said common output lead.

3. The invention as defined in claim 2, wherein the other of said first and second means also includes a diode poled to be conductive in a direction toward said common output lead.

4. The invention as defined in claim 2, wherein the other of said first and second means includes a series connected transistor switch.

5. The invention as defined in claim 1, wherein said first and second means have third and fourth junctions, respectively, fifth and sixth junctions, respectively, and seventh and eighth junctions, respectively, said third means including a first diode connected from said first junction to said third junction and being poled to be conductive toward the latter, said fourth means including a second diode connected from said second junction to said fourth junction and being poled to be conductive toward the latter, said first and second means including first and second resistors, respectively, connected from said third and fourth junctions, respectively, to an approximately constant potential conductor, said first and second anodes being connected from said first and second junctions, respectively, to said third and fourth junctions, respectively, said first and second cathodes being connected to said fifth and sixth junctions, respectively, said first and second gates being connected from said seventh and eighth junctions, respectively, said first and second means including third and fourth resistors, respectively, connected from said seventh and eighth junctions, respectively, to said fifth and sixth junctions, respectively, said fifth and sixth means including fifth and sixth resistors, respectively, connected respectively from said seventh and eighth junctions to said common input lead, said first and second normally closed switches being respectively connected from said fifth and sixth junctions to ground.

6. The invention as defined in claim 5, wherein one of said first and second means includes a diode poled to be conductive in a direction toward said common output lead.

7. The invention as defined in claim 6, wherein the other of said first and second means also includes a diode poled to be conductive in a direction toward said common output lead.

8. The invention as defined in claim 6, wherein the other of said first and second means includes a series connected transistor switch.

9. The invention as defined in claim 1, wherein a capacitor and a main power switch are provided and connected in series in that order from said common input lead to an approximately constant potential conductor adapted for connection with the ungrounded positive pole of a grounded negative pole D.C. source of potential.

* * * * *